(12) United States Patent
Love et al.

(10) Patent No.: US 8,582,257 B2
(45) Date of Patent: Nov. 12, 2013

(54) ULTRA-LOW SENSITIVITY GROUND FAULT CIRCUIT INTERRUPTER

(75) Inventors: Christopher Love, Thornhill (CA); Wei Wang, Markham (CA); Jeffrey George Dayman, Waterloo (CA)

(73) Assignee: Chris Love, Thornhill, ON (CA)

( * ) Notice: Subject to any disclaimer, the term of this patent is extended or adjusted under 35 U.S.C. 154(b) by 133 days.

(21) Appl. No.: 13/296,615

(22) Filed: Nov. 15, 2011

(65) Prior Publication Data

US 2013/0120882 A1    May 16, 2013

(51) Int. Cl.
*H02H 9/08*    (2006.01)
*H01F 27/06*    (2006.01)

(52) U.S. Cl.
USPC .............................................. 361/42; 336/65

(58) Field of Classification Search
USPC .............................................. 361/42; 336/65
See application file for complete search history.

(56) References Cited

U.S. PATENT DOCUMENTS

| | | | | |
|---|---|---|---|---|
| 4,309,681 A | * | 1/1982 | Draper et al. | 335/18 |
| 5,309,130 A | * | 5/1994 | Lint | 336/65 |
| 5,517,165 A | * | 5/1996 | Cook | 335/18 |
| 2007/0230715 A1 | * | 10/2007 | Ingemi et al. | 381/74 |

* cited by examiner

*Primary Examiner* — Scott Bauer
(74) *Attorney, Agent, or Firm* — Aaron Edgar; Gowling Lafleur Henderson LLP

(57) ABSTRACT

An ultra-low sensitivity ground fault circuit interrupter (GFCI) device and a method for manufacturing the device is disclosed. The GFCI device detects an unbalanced current between line and return conductors that results from an unintended path to ground. The GFCI device disconnects the current source when a leakage current is detected. The GFCI device includes a current transformer that has its core wrapped with the line and return conductors. The line and return conductors are secured around the core in a fixed position. During manufacture of the GFCI device an amplifier of the GFCI can be adjusted so that the GFCI device disconnects the current source when a leakage current exceeds a desired level.

9 Claims, 4 Drawing Sheets

ULTRA-LOW SENSITIVITY GROUND FAULT CIRCUIT INTERRUPTER

FIELD

The present disclosure relates generally to a ground fault interrupter circuit.

BACKGROUND

Ground fault circuit interrupter ("GFCI") devices are used to disconnect a circuit when the electric current is not balanced between the energized hot conductor and the neutral return conductor. This current imbalance can be caused by leakage current through an unplanned path to ground. As a safety device for people, a GFCI device quickly disconnects the current source from the circuit to prevent a lethal leakage current through the body of a person who is grounded. By quickly disconnecting the current source from the circuit the GFCI device can mitigate the harm caused by an electric shock.

GFCI devices are typically required by building codes to be integrated with electrical outlets, particularly in areas where an energized circuit may come into contact with people. For example, the U.S. National Electric Codes requires electrical outlets to have GFCI devices for construction sites, bathrooms, kitchens, garages, outdoor areas and near hot tubs or spas. GFCI devices can also be incorporated into electrical appliances that may be considered to pose a particular safety hazard so that protection can be provided even if the connected electrical outlet does not incorporate a GFCI. For example, long extension cords that can be used outdoors, garden equipment, or a hair dryer, could include an in-line GFCI that would minimize the risks of electric shock.

Contemporary GFCI devices are intended to protect people from electric shock by interrupting the circuit if the leakage current exceeds a range of 4-6 mA within 25 ms. A domestic power supply voltage at 50 or 60 Hz alternating current (AC) may induce ventricular fibrillation at currents as low as 60 mA. If there is a direct pathway to the heart or head, a much lower current of less than 1 mA can have a lethal effect. Electricity will always take the path of least resistance, and when this path involves people in water, there is a risk that a contemporary GFCI device's high trip level will not protect people if this path is through the heart or head. Since contemporary GFCI devices interrupt the current source at much higher amperages they may not provide a sufficient safety margin to prevent death in some cases. In addition, the higher trip level of contemporary GFCI devices may be insufficient to protect sensitive electronics or medical devices.

To adequately protect people in a wet environment, such as a hot tub or swimming pool, a GFCI device must trip far below the contemporary GFCI device trip levels of 4-6 mA. There is a need for GFCI devices that detect ultra-low leakage currents for hot tub and pool heaters, especially for units sold directly to the public where the product may not be installed professionally, have GFCI circuits included, or be connected to an outlet without proper grounding.

SUMMARY

Accordingly, there is a need for an ultra-low sensitivity GFCI device capable of detecting lower leakage currents.

According to a first aspect, there is provided a ground fault circuit interrupter (GFCI) device for sensing a leakage current between line and return conductors, the device comprising a current transformer having a core, a portion of the line and return conductors wrapped at least once around the core, the current transformer providing a fault signal induced by the leakage current; a fault-sensing circuit coupled to the current transformer to process the fault signal, the fault-sensing circuit comparing the fault signal to a reference fault threshold to determine whether to generate a protection signal; and at least one protective trigger coupled to the fault-sensing circuit for disconnecting the line conductor upon receiving the protection signal. Preferably, the portion of the line and return conductors are secured in a stable and repeatable position with respect to the core. Also preferably, the stable position is secured with a mechanical mold that includes a wrap securing portion to secure the portion of the line and return conductors wrapped around the core. Also preferably, the fault-sensing circuit includes an amplifier with an adjustable gain for amplifying the fault signal, the adjustable gain set so that when a leakage current threshold is exceeded the amplified fault signal exceeds the reference fault threshold.

According to a second aspect, there is provided a method of manufacturing a ground fault circuit interrupter (GFCI) device for sensing a leakage current between line and return conductors, the method comprising securing the line and return conductors in a wrapped position around a core of a current transformer of the GFCI device; applying a test signal to at least one of the line and return conductor to simulate the leakage current for a desired leakage current threshold of the GFCI device; and incrementing the amplification of a fault signal received from the current transformer that is based on the test signal until the amplified fault signal exceeds a reference fault threshold. Preferably, incrementing the amplification comprises adjusting a potentiometer that can be locked into place by applying an adhesive to an adjustment screw of the potentiometer.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

Figure 1:
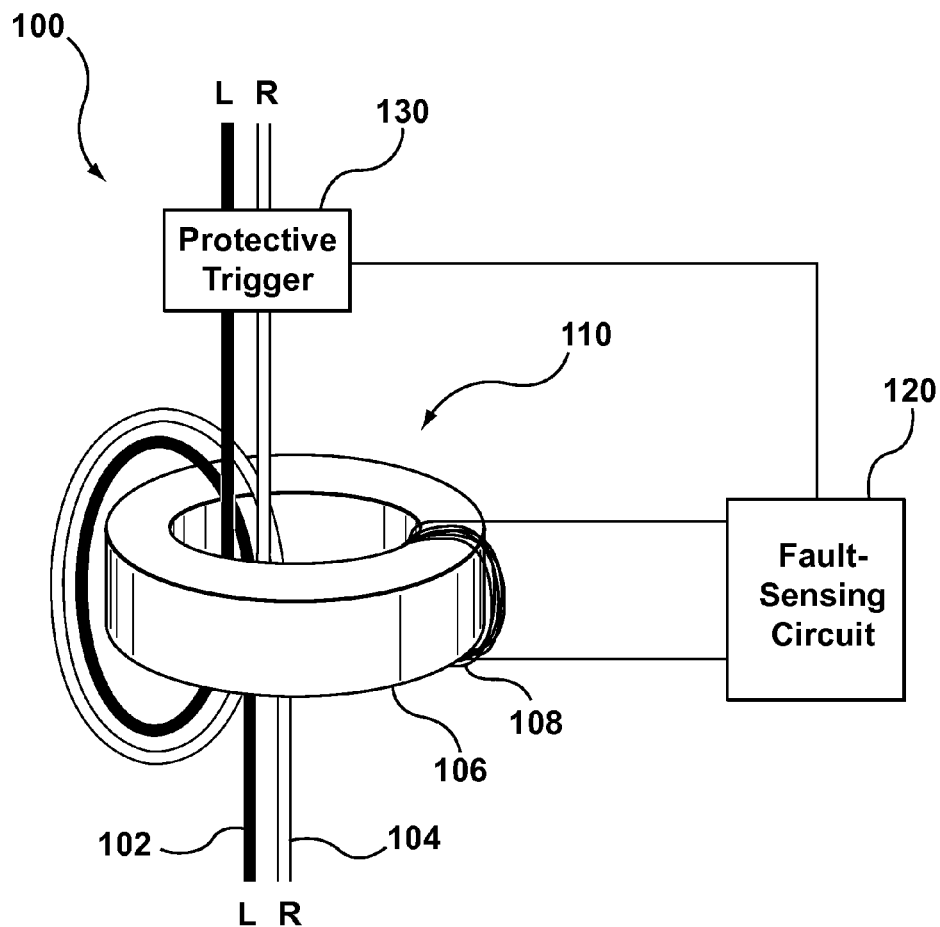
FIG. 1 is a diagram of a ground fault circuit interrupter device illustrating the current transformer.

Reference is first made to FIG. 1, shown is a diagram of a ground fault circuit interrupter device 100 (GFCI device) illustrating current transformer 110 that is connected to fault sensing circuit 120 that determines whether to activate protective trigger 130. GFCI device 100 detects a leakage current from a protected circuit when the electrical current is not balanced between line conductor 102 (also commonly referred to as the hot or live conductor) and return conductor 104 (also commonly referred to as the neutral conductor).

Current transformer 110 provides a fault signal to fault-sensing circuit 120 that is based on the leakage current. The term fault signal can refer to any induced electromagnetic field, voltage or current that is based on the leakage current. The fault signal is then processed by fault-sensing circuit 120 to determine if the leakage current exceeds a safe threshold, and if so, generates a protection signal that is coupled to protective trigger 130 (backup trigger(s) could be designed in parallel to enhance the reliability of the circuit). The current source is disconnected from line conductor 102 if protective trigger 130 receives the protection signal.

Current transformer 110 includes a core 106 that couples windings 108 to the magnetic flux induced by line and return conductors 102, 104. In a balanced state, when the line and neutral conductors are passed through the center of current transformer 110 they create opposing magnetic fields which cancel each other, thereby eliminating any net induced electro-magnetic flux into core 106 of current transformer 110. However, when there is leakage in the line conductor 102 or return conductor 104, this balance is lost and a non-zero magnetic field is produced that generates magnetic flux in core 106 which induces the fault signal into current transformer windings 108 of current transformer 110 that is processed by fault-sensing circuit 120. The fault signal scales somewhat linearly with current loss between line conductor 102 and return conductor 104.

Core 106 can be preferably implemented as a toroidal shape but other shapes can be used, for example, but not limited to, a rectangular shape with a rectangular cross-section. Only a portion of windings 108 are shown in FIG. 1 for illustration purposes.

Fault-sensing circuit 120 receives the fault signal and processes the fault signal to determine whether to activate protective trigger 130 to disconnect the line and return conductors 102, 104. Fault sensing circuit 120 is connected to windings 108 of current transformer 110 by two sensing wires. Fault-sensing circuit 120 places the two sensing wires across a resistor commonly referred to as the burden resistor that produces an AC fault voltage. The AC fault voltage varies with the strength of the leakage current and the value of the burden resistor. Fault-sensing circuit 120 then determines whether AC fault voltage exceeds a reference voltage threshold to determine whether to generate a protection signal. Protective trigger 130 disconnects the current source from the protected circuit upon receiving the protection signal. Protective trigger 130 can be implemented using an electrically operated switch, including any number of relays as is known in the art, and there may be more than one protective trigger 130 operating in parallel to improve the reliability of the overall circuit.

Contemporary current transformers have a linear response but typically only over a narrow segment. Manufacturers of current transformers typically provide a response curve for the current transformer that illustrates the minimum and maximum currents between which the current transformer response is linear. Below and above these currents the core will be under excited or over saturated, respectively, and the response will be non-linear.

In order to design current transformer 110 that is capable of detecting low-level ground faults a number of competing factors were considered. Low-level ground faults are typically those with a leakage current less than 2 mA, preferably less than 1 mA, and in applications involving water, preferably less than 0.5 mA. First, selecting a smaller core 106 will require less differential electricity between conductors 102, 104 to excite current transformer 110 into the linear region. Another factor is the material of core 106. Preferably, keeping core 106 as small as possible and using highly magnetic material can provide optimum results, such as, for example, a high grade Nickel alloy. Current transformer 110 can also use electromagnetic interference (EMI) shielding to prevent noise from degrading the quality of the leakage current signal. Despite selecting a small and highly magnetic core with EMI shielding, low level leakage current, such as below 1 mA, may not be sufficient to excite the current transformer 110 into the linear portion of the response curve. Preferably, current transformer 110 is selected for its applicability for GFCI applications which includes cores with a hole diameter that can vary from 5 mm (0.2 inches) to 15 mm (0.59 inches) and an outer diameter that can vary from 4 mm (0.15 inches) to 25 mm (0.98 inches).

The current induced in windings 108 can also be scaled by wrapping a portion of line and return conductors 102, 104 around core 106 as shown in FIG. 1. Wrapping core 106 amplifies the AC fault current generated by the leakage current thus exciting current transformer 110 and shifting the magnitude of the signal into the linear region. Wrapping core 106 with a portion of line and return conductors 102, 104 once will approximately double the induced current and increase the signal-to-noise-ratio (SNR), but wrapping core 106 is limited by the hole diameter of core 106 and the width or gauge of line and return conductors 102, 104. Line and return conductors 102, 104 should a have a sufficient diameter to safely support the current capacity for 120 V AC at 50 or 60 Hz for the selected load. The diameter or cross-section (or equivalent cross-section for stranded wires) of conductors 102, 104 determines whether current can safely be supplied without raising the temperature of conductors enough to melt the covering plastic wire insulation or cause other fire hazards. The diameter of the conductor is controlled by electrical specifications and reflected by the AWG label. The conductor diameter limits the amount of wrapping of core 106 reflective of the area of the hole in core 106. Wire in the range of UL rated AWG 10 to AWG 14 is typically used for most residential applications and limits the amount of wrapping of line and return conductors 102, 104. Wrapping line and return conductors 102, 104 is distinguished from windings 108 due their respective current carrying capacity. Windings 108 are suitable for carrying a current typically under 20 Amps whereas line and return conductors 102, 104 must be capable of safely carrying current from a 120 Volts AC at 50 or 60 Hz source to the load.

Portions of line and return conductor 102, 104 also do not necessarily need to be wrapped side-by-side as shown in FIG. 1. It may also be possible to wrap one conductor around one section of core 106 and the other conductor around another, possibly non-adjacent, section of core 106.

GFCI device 100 can be used as an in-line GFCI for a pool or spa heater to target a leakage current below 1 mA. In an example embodiment for these applications, current transformer 110 can be implemented using a commercially available current transformer with a nickel core and EMI shielding used for GFCI applications, such as, for example, the CR8420-1000G from CR Magnetics. Using wiring suitable for this application, typically around 10-14 AWG, line and return conductors 102, 104 can wrap around core 106 at least once due to the thickness of conductors 102, 104 and the diameter of the hole in core 106. Wrapping the CR8420-1000G core once with the conductors approximately doubles the detectable input signal to allow operation in an approximately linear portion of the response curve for current transformer 110. In some embodiments using this configuration, a target leakage current below 0.45 mA can be reliably detected and has been determined empirically to be an approximately linear response.

Wrapping core 110 with line and return conductors 102, 104 increases the signal and improves the SNR, but it can also cause issues related to the stability of the magnetic field if conductors 102, 104 are free to move with respect to core 106. For example, movement of the wrapped conductors 102, 104 around core 106, changes in tightness of wrapping and vibration or jostling of conductors 102, 104 could induce relatively significant changes of the magnetic flux in core 106 that may translate into false tripping of GFCI device 100, or worse, a missed or delayed tripping of GFCI device 100. Wrapping of line conductor 102 and return conductor 104 should be secured in a stable position to avoid these effects. The stable position should ensure that the diameter of the wrapping does not substantially change and that the relevant position between the conductors 102, 104 does not substantially change. Conductors 102, 104 can be mechanically secured in a stable position with respect to core 106, for example, but not limited to, using a resin epoxy, glue, a mechanical mold, or any other means of stabilizing the conductors 102, 104 around core 106. Alternatively, a custom current transformer 110 can be manufactured to integrate wrapping of conductors 102, 104 into the overall design to ensure a stable position so long as integrated conductors 102, 104 have sufficient current-carrying capacity (i.e. similar to 10-14 AWG wire).

Figure 3:
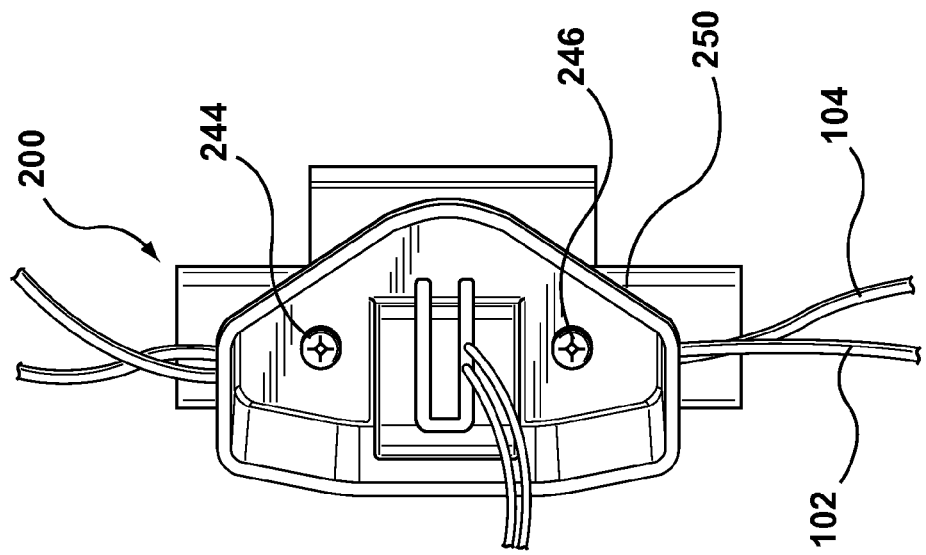
FIG. 3 is a perspective view of mold of FIG. 2 with the top portion secured to the mold.
Figure 2:
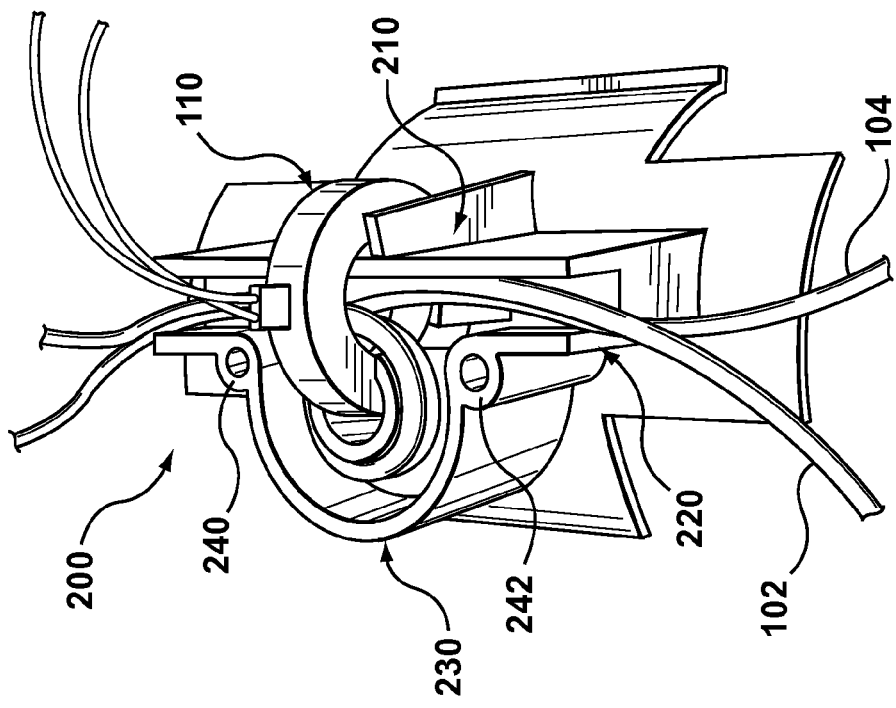
FIG. 2 is a perspective view of mold for securing wrapping of the line conductor and the return conductor around a current transformer.

Referring now to FIG. 2, shown is a perspective view of mold 200 for securing wrapping of line conductor 102 and return conductor 104 around current transformer 110 in a stable position. Line conductor 102 and return conductor 104 can be a twisted pair to minimize the effects of external EMI. Minimizing the distance from the induced fault current in current transformer 110 to amplifier 122 can also reduce possible effects of external EMI. Mold 200 includes a current transformer securing portion 210 that secures current transformer 110 in a position so that line and return conductors 102, 104 positioned in channel 220 align with the hole of current transformer 110. Current transformer 110 is illustrated with an EMI shield in place. Wrap securing portion 230 of mold 200 provides a round channel to secure the portion of line and return conductors 102, 104 that wrap around core 106 of current transformer 110. Pilot holes 240 and 242 are used to secure top portion 250 to mold 200 using screws 244, 246 as shown in FIG. 3. Top portion 250 can be secured by other means, such as, a mechanical latch or clip; using glue or epoxy; or a compression fit. Top portion 250 will impinge upon line and return conductors 102, 104 to fix and secure them in place within channel 220 and wrap securing portion 230 when top portion 250 is secured in place. Top portion 250 is designed to accommodate conductors 102, 104 with minimal clearance to secure conductors 102, 104. Alternatively to securing top portion 250, channel 220 and wrap securing portion 230 can be filled with a resin epoxy that, once hardened, will secure line and return conductors 102, 104 in a fixed and stable position.

An advantage of using mold 200 is that conductors 102, 104 can be secured in a manner that limits the variance between subsequent GFCI assemblies. This helps to ensure some amount of repeatability with the wrapping of line and return conductors 102, 104 between GFCI devices 100. The position of conductors 102, 104 can significantly affect the magnitude of the AC fault voltage generated by the leakage current. Using mold 200 helps limit the variation in the response of current transformer 110 between assemblies in manufacturing so that similar leakage currents will generate similar AC fault voltages. This also narrows the required tuning range of fault-sensing circuit 120.

Figure 4:
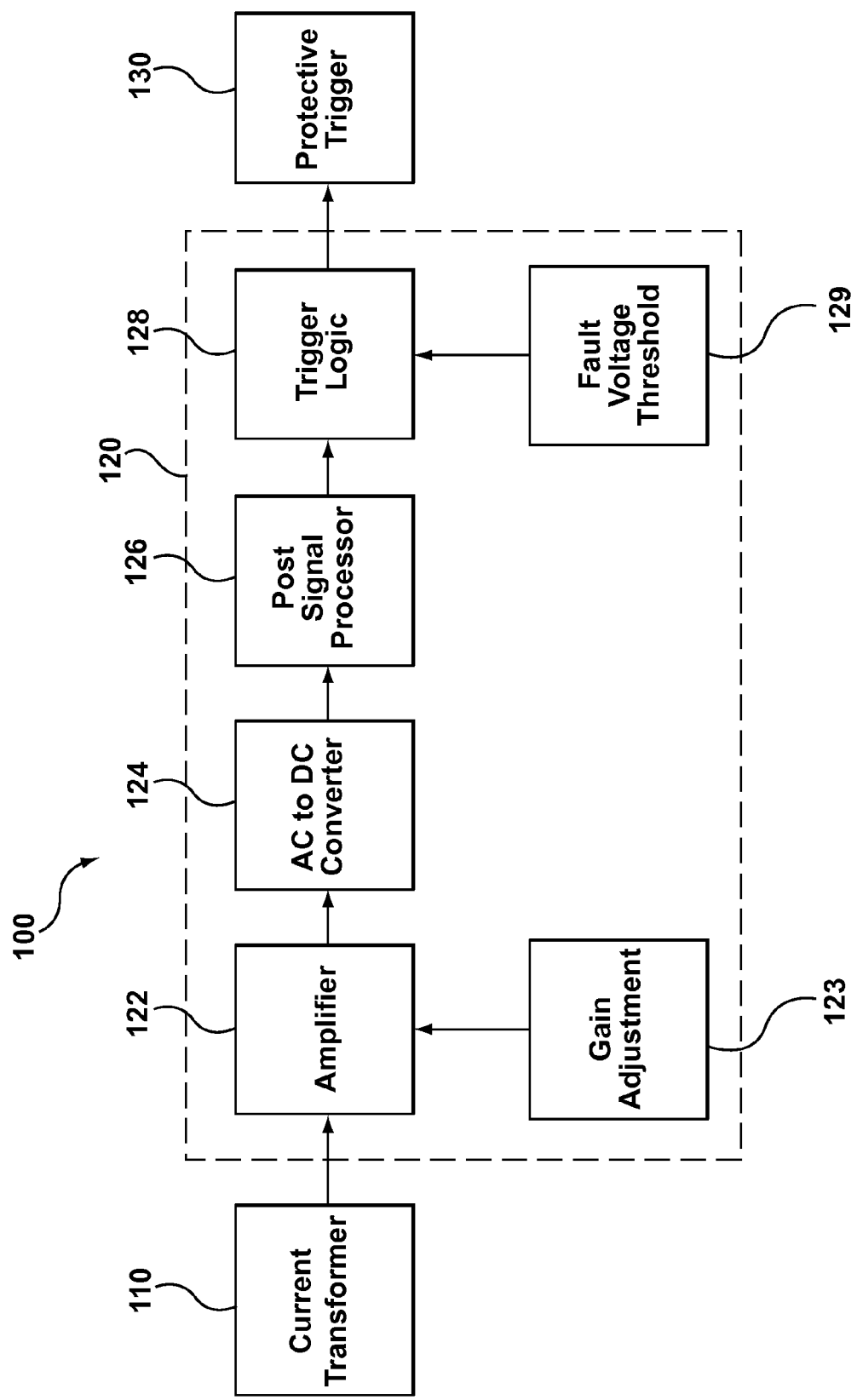
FIG. 4 is a block diagram of a GFCI device illustrating the components of the fault-sensing circuit.

Referring now to FIG. 4, shown is a block diagram of GFCI device 100 illustrating the components of an embodiment of fault-sensing circuit 120. Fault sensing circuit 120 receives the fault signal from current transformer 110 and determines whether to activate protective trigger 130. As described above, current transformer 110 detects a difference in the AC current flowing between line conductor 102 and return conductor 104. This difference indicates a leakage or ground fault that causes an induced current in windings 108 of current transformer 110, which is scaled by the number of turns about core 106. The induced (and scaled) current from current transformer 110 is applied to a burden resistor of amplifier 122 producing a proportional AC fault voltage.

The AC voltage signal is then amplified by amplifier 122 to increase the signal strength. Amplifier 122 can be implemented using a high performance operational amplifier (op-amp) package capable of sufficient gain and SNR. For example, amplifier 122 can be implemented using the OP177 from Analog Devices as it offers a high and stable open-loop gain over its operating range while providing a high Common Mode Rejection Ratio (CMRR) and improved immunity to power supply noise.

The gain of amplifier 122 can be adjusted by gain adjustment 123 that can be used to tune the gain of amplifier 122 so that fault-sensing circuit 120 triggers when the desired threshold of leakage voltage is detected. Gain adjustment 123 can adjust the gain of amplifier 122 in a number of ways. For example, if amplifier 122 employs an operational amplifier in a negative feedback configuration then gain adjustment 123 can be implemented as a potentiometer to vary the feedback, and thus the gain, of amplifier 122. Alternatively, or in combination with gain adjustment 123, fault-sensing circuit 120 can also be tuned to trigger at the desired threshold of leakage voltage by lowering the fault voltage threshold 129. By reducing the fault voltage threshold 129 to a smaller magnitude, the relative source signal does not need to be as high, thereby preventing the necessity for higher amplification. This is a desired compromise since with any amplification comes the degradation of the quality of the signal, or signal to noise ratio (SNR). By minimizing the need for higher amplification, thus maintaining a closer value to the source signal's magnitude, a better quality signal is realized, thereby improving the overall accuracy of the circuitry. This reduction however has a lower floor reflecting the ambient noise level of the operating environment which the fault signal voltage and reference signal voltage must remain above to ensure a sufficient SNR.

Tuning of fault-sensing circuit 120 is performed after GFCI device is assembled and line and return conductors 102, 104 are mechanically secured around core 106. This allows gain adjustment 123 to adjust gain of amplifier 122 to account for variability in wrapping of conductors around core 106 and variability in electronic components of fault-sensing circuit 120, such as resistors, capacitors, and board traces that can cause differences in the response. Due to this variability it is unlikely that any two GFCI devices would have the exact same tuned gain, but the variability between subsequent manufactured systems would be relatively small due the aforementioned considerations.

Gain adjustment 123 allows GFCI device 100 to be configured for an exact trip point by using a reference fault signal in post-manufacturing configuration. The reference fault signal can simulate an AC leakage current that is based on the desired trip point. The reference fault signal is introduced and gain adjustment 123 can then be adjusted upwards until GFCI device 100 initiates the protective action to set the gain of amplifier 122. Gain adjustment 123 can be implemented as a potentiometer with a screw used to vary the internal resistance. The screw can be adjusted by a person or machine/test rig to amplify the desired leakage voltage. The position of the adjustment screw can then be fixed after tuning has been completed using a strong adhesive to bind the adjustment screw to the body of the potentiometer so that the gain of amplifier 122 cannot be altered.

Prior art approaches have used potentiometers to vary the resistance of the burden resistor, but varying the burden resistor alters the response curve of current transformer 110. Since the presently disclosed embodiment is used for small signals operating near the edge of linear portion of the response curve of current transformer 110, varying the resistance of the burden resistor is not practical. Fault sensing circuit 120 uses a fixed resistance burden resistor. Varying the burden resistor has the effect of changing the sensitivity of current transformer 110 such that small leakage currents may not be detected.

The amplified signal from amplifier 122 is a scaled AC voltage signal that reflects the difference in the current between line conductor 102 and return conductor 104. The scaled AC voltage signal is then passed to AC-to-DC converter 124 which converts the signal to direct current (DC). Processing direct current signals is much more accurate. AC-to-DC converter 124 can implement any number of AC to DC rectifier circuits as is known to a person skilled in the art. Preferably, AC-to-DC converter 124 uses full wave rectification so that tripping can occur on a half-cycle of the 60 Hz AC line voltage rather than a slower full cycle.

The signal output from AC-to-DC converter 124 will still have some AC ripple noise that is then mostly removed by post-signal processor 126. Post-signal processor 126 can be implemented as a low-pass filter that can be used to smooth out the AC ripple to provide a more accurate DC signal. Preferably, the low-pass filter network is designed to minimize AC ripple from a 50 or 60 Hz source without adding substantial delay or impacting the ability to detect an increasing leakage current.

The processed signal from post-signal processor 126 is then fed to trigger logic 128 to determine if the leakage voltage exceeds a threshold. Trigger logic 128 typically includes a comparator circuit that compares the received processed signal with a threshold. The comparator circuit can be implemented using an op-amp based circuit, a dedicated comparator chip or other comparator circuit as is known to a person skilled in the art. Fault voltage threshold 129 can provide a threshold DC voltage to the comparator of trigger logic 128. The voltage supplied by fault voltage threshold 129 should correspond to what the received DC processed signal at trigger logic 128 would be if the protected leakage current is observed. For example, if the desired leakage current protection is 0.5 mA then this leakage current would cause an AC voltage over the burden resistor that would then be amplified by amplifier 122, DC rectified by AC-to-DC converter 124, and smoothed by post signal processor 126 to provide a DC input voltage to trigger logic 128 that is compared to a threshold voltage provided by fault voltage threshold 129. Gain adjustment 123 can be used select the gain of amplifier 122 to obtain the desired DC input voltage to trigger logic 128. Typically, a safety or guard band is used to accommodate for slight variances in electronics and due to temperature. For example, if a leakage current of 0.5 mA is desired then a 10% guard band may be used to configure fault-sensing circuit 120 to trip when a leakage current of 0.45 mA is detected.

The output signal from trigger logic 128 is connected to protective trigger 130. If trigger logic 128 detects that the protected leakage current has been exceeded a signal will be provided to protective trigger 130 that causes protective trigger 130 to disconnect the power source supplying current to line conductor 102. Additional protective triggers may be employed in parallel to improve the reliability of the GFCI circuit. Quickly disconnecting the power source can mitigate the effects of electric shock. Protective trigger 130 can be implemented using any number of relays.

Figure 5:
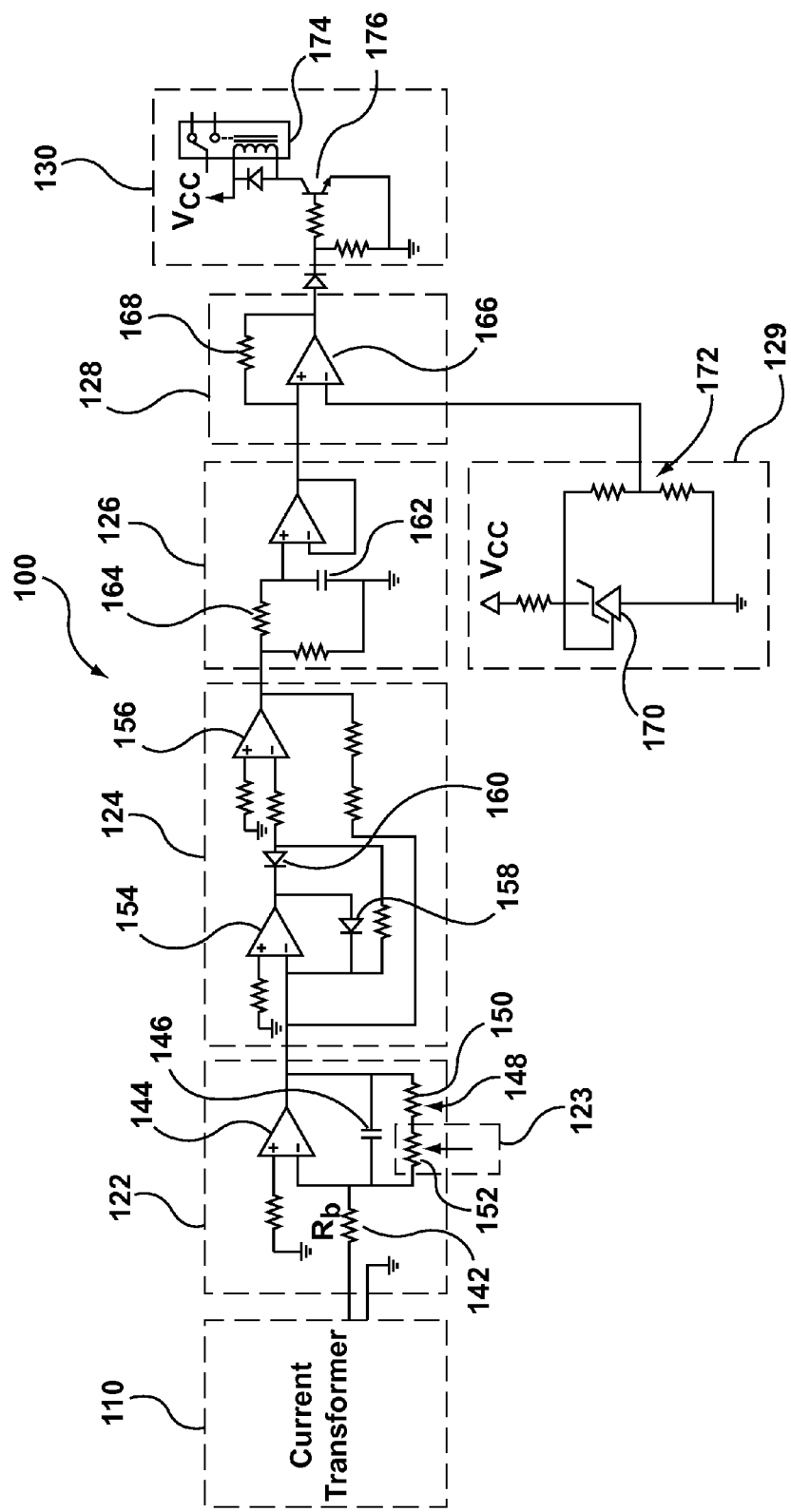
FIG. 5 is a block diagram of GFCI device illustrating an embodiment of circuit components of fault-sensing circuit.

Reference is next made to FIG. 5, shown is a block diagram of GFCI device 100 illustrating an embodiment of circuit components of fault-sensing circuit 120. Current transformer 110 applies the induced current to burden resistor $R_b$ 142 that is selected as a 440 Ohm resistor to operate in the linear portion of the response curve of the current transformer 110. Amplifier 122 is implemented using operational amplifier (op-amp) 144 in a negative feedback configuration including capacitor 146 and resistance network 148.

Resistance network 148 can be composed of a base resistor 150 and a potentiometer 152 or just a single potentiometer 152. Gain adjustment 123 is provided by potentiometer 152 that serves to adjust the gain of op-amp 144 in the negative feedback configuration. Base resistor 150 can provide the minimum required gain of amplifier 122 when potentiometer 152 is short circuited (i.e. providing zero resistance) and the top range of potentiometer 152 can provide the maximum required gain. Potentiometer 152 allows an optimal gain to be selected in post-manufacturing for amplifier 122 to account for variability in wrapping core 106 with line and return conductors 102, 104 and the variability of the electronic components.

In the embodiment shown in FIG. 5, AC-to-DC converter 124 is implemented as a full wave precision rectifier circuit provided by op-amps 154, 156 and diodes 158, 160. The first stage, provided by op-amp 154 and diodes 158, 160, obtains a positive rectified signal, and the second stage, provided by op-amp 156, inverts the signal polarity. The full wave precision rectifier circuit has good linearity down to a couple of mV at low frequencies. The low-pass filter implemented by post signal processor 126 then removes most of the AC ripple. FIG. 5 illustrates a passive low-pass filter that is provided by capacitor 162 and resistor 164. Using this passive low-pass filter a 16 Hz cutoff frequency can be provided using a 10 uF capacitor 162 and 1 kOhm resistor 164.

Trigger logic 128 next compares the DC output voltage from the low-pass filter to fault voltage threshold 129 to determine whether to trigger protective action. FIG. 5 illustrates an embodiment of trigger logic 128 using op-amp 168 in a Schmitt trigger configuration with hysteresis resistor 168. If the DC output voltage at the non-inverting input to op-amp 168 exceeds the threshold voltage provided by fault voltage threshold 129 then op-amp 168 will saturate. The reference or fault voltage provided by fault voltage threshold 129 can be implemented using shunt regulator 170 and a resistive voltage divider 172 to obtain the desired voltage. The desired voltage may also be adjusted, either by shunt regulator 170 or voltage divider 172, to tune fault-sensing circuit 120, but tuning of amplifier 122 is preferred.

Shunt regulator 170 can be implemented using a TLV431 from ON Semiconductor. The TLV431 is a precision low voltage shunt regulator that is programmable over a wide voltage range. The guaranteed reference accuracy can be as low as 0.5% at 25 degrees Celsius and 1.0% over the entire industrial operating range.

Protective trigger 130 is shown in FIG. 5 to include single-pole, double-throw (SPDT, Form C) bi-stable relay 174. Output from the comparator of trigger logic 128 is provided to transistor 176 to drive current through relay 174 to open the switch. Relay 174 disconnects line conductor 102 from the current source to mitigate the effects of electric shock. Protection trigger 130 can also include redundant protection mechanisms, such as, for example, a secondary relay or a microprocessor that samples the protection signal to determine whether to disable or disconnect other parts of a system that may be the cause of the leakage current.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

We claim:

1. A ground fault circuit interrupter (GFCI) device for sensing a leakage current between line and return conductors, the device comprising:
   a current transformer having a core, a portion of the line and return conductors wrapped at least once around the core, the current transformer providing a fault signal induced by the leakage current;
   a fault-sensing circuit coupled to the current transformer to process the fault signal, the fault-sensing circuit comparing the fault signal to a reference fault threshold to determine whether to generate a protection signal; and
   a protective trigger coupled to the fault-sensing circuit for disconnecting the line conductor upon receiving the protection signal,
   wherein the portion of the line and return conductors are secured in a stable position with respect to the core,
   wherein the fault-sensing circuit includes an amplifier with an adjustable gain for amplifying the fault signal, the adjustable gain set so that when a leakage current threshold is exceeded the amplified fault signal exceeds the reference fault threshold, the amplifier comprises an op-amp and the adjustable gain comprises a potentiometer, the op-amp is in a negative feedback configuration and the potentiometer adjusts gain of the amplifier by changing a feedback ratio of the negative feedback configuration, and
   wherein the fault-sensing circuit comprises a full wave rectifier AC-to-DC converter to rectify the amplified fault signal.

2. The device of claim 1, wherein the stable position is secured with a mechanical mold facilitating repeatability of the magnetic field production.

3. The device of claim 2, wherein the line and return conductors are safely capable of carrying current of at least 120 Volt AC voltage source.

4. The device of claim 3, wherein the mechanical mold includes a wrap securing portion to secure the portion of the line and return conductors wrapped around the core with minimal variation between assemblies.

5. The device of claim 4, wherein the mechanical mold further comprises a top portion that impinges upon the portion of line and return conductors within the wrap securing portion.

6. The device of claim 1, wherein the reference fault threshold is provided by a voltage shunt regulator.

7. A method of manufacturing a ground fault circuit interrupter (GFCI) device for sensing a leakage current between line and return conductors, the method comprising:
   securing a portion of the line and return conductors in a stable wrapped position at least once around a core of a current transformer of the GFCI device;
   applying a test signal to at least one of the line and return conductor to simulate the leakage current for a desired leakage current threshold of the GFCI device, the GFCI device comprising a fault-sensing circuit coupled to the current transformer to process the test signal, the fault-sensing circuit comparing a fault signal received from the current transformer to a reference fault threshold to determine whether to generate a protection signal, the fault-sensing circuit includes an amplifier with an adjustable pain for amplifying the fault signal, the amplifier comprises an op-amp and the adjustable gain comprises a potentiometer, the op-amp is in a negative feedback configuration and the potentiometer adjusts gain of the amplifier by changing a feedback ratio of the negative feedback configuration, the fault-sensing circuit comprises a full wave rectifier AC-to-DC converter to rectify the amplified fault signal; and
   incrementing the amplification of the fault signal received from the current transformer that is based on the test signal until the amplified fault signal exceeds a reference fault threshold, wherein incrementing the amplification comprises adjusting the potentiometer so that the test signal causes the amplified fault signal to exceed the reference fault threshold to account for circuit variability.

8. The method of claim 7 further comprises locking the adjustment of the potentiometer when the amplified fault signal exceeds the reference fault threshold.

9. The method of claim 8, wherein the potentiometer includes an adjustment screw, and locking the potentiometer comprises applying adhesive to the adjustment screw.

\* \* \* \* \*